May 30, 1967     M. R. WILLIAMSON     3,322,642
INTEGRATED NUCLEAR REACTOR-STEAM GENERATOR
Filed June 29, 1965
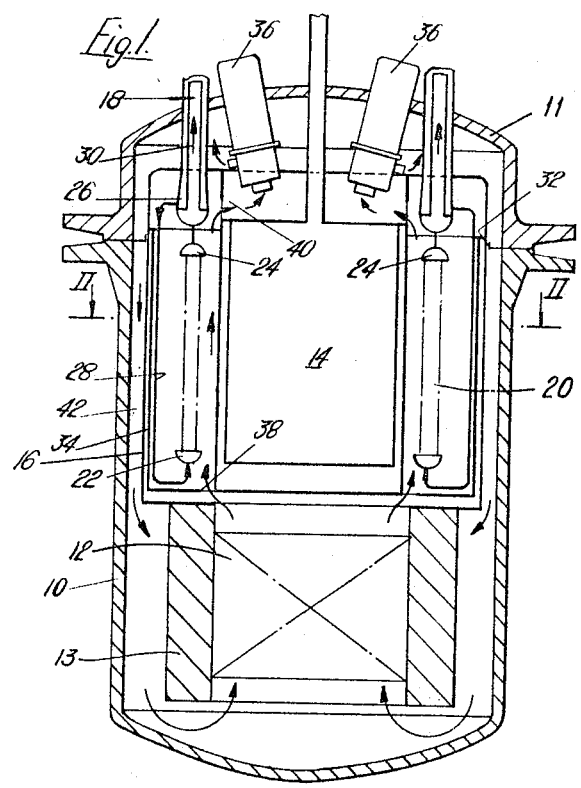
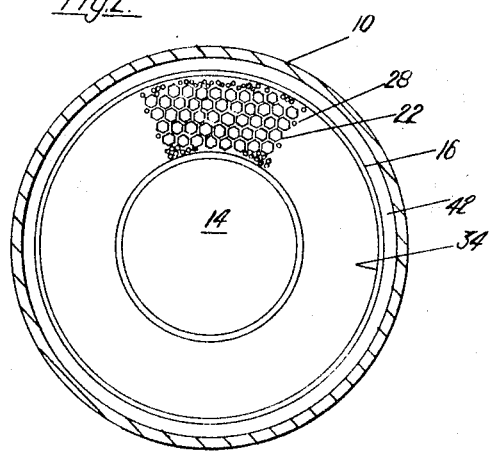

United States Patent Office 3,322,642
Patented May 30, 1967

3,322,642
INTEGRATED NUCLEAR REACTOR-STEAM
GENERATOR
Malcolm Richard Williamson, Slough, England, assignor to United Kingdom Atomic Energy Authority, London, England
Filed June 29, 1965, Ser. No. 468,063
Claims priority, application Great Britain, June 29, 1964, 26,822/64
2 Claims. (Cl. 176—54)

This invention relates to vapour generators and it is to be understood that where, herein, the words "water" and "steam" are used, they are intended to denote any liquid and its vapour unless the context requires otherwise.

More specifically, the invention is concerned with so-called integrated nuclear reactor-steam generator systems in which the heating surface is housed in the same vessel as the reactor core so as to be heated by the primary coolant therefrom. Such systems have the advantage over systems in which the steam generator is outside the reactor vessel of compactness and saving of pipework and are, therefore, of particular interest in marine applications.

In the arrangement with which the invention is concerned, the steam generating tubes are in the form of modules terminating in inlet and outlet manifolds connected to inlet and outlet headers passing through the upper end of the vessel. These modules are arranged within an annular chamber in the upper part of the vessel through which the primary coolant is circulated. In the most economical design providing good use of the space within the annular chamber, the tubes of each module are arranged in hexagonal rings with hexagonal or circular manifolds so that the cross section of a module is hexagonal. This enables the modules to be disposed in a cylindrical or annular space with the tubes of all the modules substantially uniformly pitched and with little of the space unoccupied. There must, of necessity, however be a certain amount of unoccupied space near the outer wall of the space if it is cylindrical or near the outer and inner walls of the space if it is annular. Apart from the undesirability of having unoccupied space, this also has the defect of providing passages of low resistance through which the heating fluid will preferentially flow, by-passing the tubes and leading to waste of heat and to uneven heating.

One solution of the problem is to blank off this unoccupied space but a better scheme is to utilise it. In accordance with the invention there is provided an integrated nuclear reactor-steam generator system of the type in which the heating surfaces comprise steam generating tube modules closely and uniformly positioned in an annular chamber in the upper part of the vessel through which chamber the primary coolant path is directed so that the coolant flows around the modules, and in which at least some of the modules have a downcomer located in the chamber between the modules and the chamber wall and/or between adjacent modules, the arrangement of the modules and downcomers being such that substantially no low resistance paths are left for the primary fluid.

Preferably substantially all of the modules have downcomers located in the chamber between the modules and the chamber wall and/or between adjacent modules.

An integrated system in accordance with the invention will now be described, by way of example, with reference to the accompanying diagrammatic drawing, in which:

FIGURE 1 is a sectional elevation through the system; and
FIGURE 2 is a section taken on the line II—II of FIGURE 1.

The system shown comprises a vertical cylindrical vessel 10 having a removable lid 11 and housing at the lower end a reactor core 12 surrounded by shielding 13. Extending upwards from the core, there is an outer cylindrical trunk 16 closed at the upper end and containing an inner cylindrical trunk 14 closed at both ends. Control rods (not shown) for the core pass through the trunk 14 which contains other control gear.

Two inlet/outlet headers 18 pass through the lid 11 and the top of the trunk 16, although there may be more or less. The headers are connected to a number of tube modules 20 terminating in inlet and outlet manifolds 22 and 24, respectively. The inlet/outlet headers 18 comprise an annular inlet channel 26 connected to the inlet manifolds 22 by downcomers 28 and a cylindrical outlet channel 30 connected to the outlet manifolds 24.

At the level of the joint between the vessel 10 and the lid 11, there is a joint 32 which may, for example, be as described in my copending application Ser. No. 468,038 of even date, between the trunk 16 and an annular casing 34 for the modules. This allows the steam generator to be removed as a unit from the vessel 10 together with the lid 11.

Extending through the lid 11 and the top of the trunk 16 are circulating pumps 36 for the primary coolant, the circuit of which is from the core 12, into and out of the casing 34, through ports 38 and 40, and a pump 36, and down to the core through an annular downcomer space 42 between the trunk 16 and the vessel 10.

As shown in FIGURE 2, the inlet manifolds 22 of the modules 20 are hexagonal and are arranged so as to occupy by far the greater part of the cross-section of the annular space in which they are housed. In order not to impede the flow of the primary coolant past them, they can be vertically staggered if, as is shown, the coolant follows a rectilinear path; alternatively, they can also be at the same level and the primary coolant be made to pass across the tubes as shown and described in copending application Ser. No. 468,037 filed on even date by John Heathcote and assigned in common with this application.

It is not possible for the whole of the cross-section of the annular space to be occupied by the manifolds and the unavoidably unused spaces are utilized by passing through them the downcomers 28. In practice, it is found that on the one hand, these spaces are sufficiently large to house all the downcomers which are required to feed the modules and on the other hand to be so filled by the downcomers as substantially to preclude the existence of low resistance paths for the primary coolant.

Boiling in the downcomers must be avoided particularly if there is to be natural circulation on the water side. That condition is satisfactorily met as the downcomer heat transfer area is small in comparison with that of the modules.

What is claimed is:
1. An integrated nuclear reactor-steam generator system of the type wherein heating surfaces at which the steam is generated are housed in the same vessel as a reactor core and are heated by a primary coolant passed through the core, said system comprising chamber-defining means situated internally in the upper part of the vessel to form with walls of the vessel an annular chamber having primary coolant inlet and outlet openings for directing primary coolant through the chamber, steam generating modules closely and uniformly positioned in the chamber, said modules collectively constituting the heating surfaces at which the steam is generated and individually including a tube bundle exposed to the primary coolant directed through the chamber, and downcomers for the modules located in the chamber to occupy spaces left vacant between the modules whereby substantially no low resistance flow paths for the primary coolant are left in the chamber.

2. A system according to claim 1 wherein the tube bundle of each steam generating module is substantially hexagonal in outline and the downcomers are in spaces bounded by peripherally positioned modules.

References Cited
UNITED STATES PATENTS

| | | | |
|---|---|---|---|
| 3,226,300 | 12/1965 | Zmola et al. | 176—61 X |
| 3,245,879 | 4/1966 | Purdy et al. | 176—65 X |
| 3,245,881 | 4/1966 | Ammon et al. | 176—65 X |

REUBEN EPSTEIN, *Primary Examiner.*